United States Patent
Kwon et al.

(10) Patent No.: US 8,892,511 B2
(45) Date of Patent: Nov. 18, 2014

(54) APPARATUS AND METHOD FOR SYNCHRONIZING DATA IN CONNECTED DEVICES

(75) Inventors: Joon-Hwan Kwon, Suwon-si (KR); Gyu-Tae Park, Seoul (KR); Jae-Seok Park, Seoul (KR); Kwang-Min Kim, Seongnam-si (KR); Mi-Hwa Park, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 17 days.

(21) Appl. No.: 13/301,588

(22) Filed: Nov. 21, 2011

(65) Prior Publication Data

US 2012/0130952 A1  May 24, 2012

(30) Foreign Application Priority Data

Nov. 23, 2010 (KR) .................. 10-2010-0116722

(51) Int. Cl.
*G06F 17/30* (2006.01)
*G06Q 10/10* (2012.01)

(52) U.S. Cl.
CPC ..................... *G06Q 10/10* (2013.01)
USPC ........... 707/610; 707/611; 707/620; 707/695; 709/227; 709/228

(58) Field of Classification Search
CPC ............... G06F 17/30578; G06F 17/30581; G06F 17/30174; G06F 11/1402; G06F 11/1448; G06F 11/1469
USPC ............... 707/610, 611, 613, 620, 625, 695; 709/246, 227–228
See application file for complete search history.

(56) References Cited

U.S. PATENT DOCUMENTS

| | | | | |
|---|---|---|---|---|
| 7,246,214 B2* | 7/2007 | Nakano et al. | ............... | 711/163 |
| 7,954,150 B2* | 5/2011 | Croft et al. | ............... | 726/21 |
| 8,010,679 B2* | 8/2011 | Low et al. | ............... | 709/227 |
| 8,051,180 B2* | 11/2011 | Mazzaferri et al. | ............... | 709/227 |
| 8,117,314 B2* | 2/2012 | Croft et al. | ............... | 709/227 |
| 8,341,270 B2* | 12/2012 | Mazzaferri et al. | ............... | 709/227 |
| 2003/0007505 A1* | 1/2003 | Noda et al. | ............... | 370/467 |
| 2003/0046434 A1* | 3/2003 | Flanagin et al. | ............... | 709/248 |
| 2003/0154187 A1* | 8/2003 | Hayakawa et al. | ............... | 707/1 |
| 2004/0153536 A1* | 8/2004 | Strassner | ............... | 709/223 |
| 2004/0193609 A1* | 9/2004 | Phan et al. | ............... | 707/10 |
| 2005/0055352 A1* | 3/2005 | White et al. | ............... | 707/10 |
| 2005/0256907 A1* | 11/2005 | Novik et al. | ............... | 707/200 |
| 2006/0159109 A1* | 7/2006 | Lamkin et al. | ............... | 370/401 |
| 2006/0168126 A1 | 7/2006 | Costa-Requena et al. | | |
| 2006/0190506 A1* | 8/2006 | Rao et al. | ............... | 707/204 |

(Continued)

FOREIGN PATENT DOCUMENTS

WO     WO 00/29998 A2     5/2000

OTHER PUBLICATIONS

European Search Report dated Feb. 24, 2012 in connection with European Patent Application No. Ep 11 19 0173.

*Primary Examiner* — Hanh Thai (57) ABSTRACT

A network-connectable terminal can synchronize data in connected devices. The network-connectable terminal includes a memory unit and a synchronization unit. The memory unit stores metadata updated according to update of data. The synchronization unit updates the metadata, creates version information indicating whether the metadata are updated, and exchanges version information with peripheral devices to determine a peripheral device and data requiring synchronization.

21 Claims, 9 Drawing Sheets

(56) References Cited

U.S. PATENT DOCUMENTS

| | | |
|---|---|---|
| 2006/0200599 A1* | 9/2006 | Manchester et al. ............ 710/62 |
| 2006/0206533 A1 | 9/2006 | MacLaurin et al. |
| 2006/0288053 A1* | 12/2006 | Holt et al. .................... 707/203 |
| 2007/0192797 A1 | 8/2007 | Kang et al. |
| 2008/0005195 A1* | 1/2008 | Li .............................. 707/203 |
| 2008/0059656 A1* | 3/2008 | Saliba et al. ................. 709/248 |
| 2008/0114795 A1* | 5/2008 | Agrawal et al. .............. 707/101 |
| 2008/0222212 A1 | 9/2008 | Prasad et al. |
| 2008/0317068 A1* | 12/2008 | Sagar et al. .................. 370/503 |
| 2009/0006489 A1* | 1/2009 | Ramasubramanian et al. ........................... 707/201 |
| 2009/0006498 A1* | 1/2009 | Freedman .................... 707/203 |
| 2009/0070373 A1* | 3/2009 | Jeong et al. ................ 707/104.1 |
| 2009/0125518 A1* | 5/2009 | Bailor et al. ...................... 707/8 |
| 2009/0144343 A1* | 6/2009 | Holt et al. .................... 707/203 |
| 2009/0157811 A1* | 6/2009 | Bailor et al. ................. 709/204 |
| 2009/0196179 A1* | 8/2009 | Clark et al. .................. 370/235 |
| 2009/0196311 A1* | 8/2009 | Khosravy ..................... 370/503 |
| 2009/0198702 A1* | 8/2009 | Novik et al. .................... 707/10 |
| 2009/0234872 A1* | 9/2009 | Padgett ........................ 707/102 |
| 2009/0248713 A1* | 10/2009 | Park et al. .................... 707/100 |
| 2009/0327358 A1* | 12/2009 | Lukiyanov et al. ........... 707/203 |
| 2010/0250591 A1* | 9/2010 | Morris ......................... 707/770 |
| 2011/0158260 A1* | 6/2011 | Piwonka et al. ............. 370/503 |

\* cited by examiner

| DEVICE ID | LOCAL METADATA VERSION (UPDATE COUNTER) | CREATION DATA/TIME | GARBAGE COLLECTION DATE/TIME |
|---|---|---|---|
| 701 | 703 | 705 | 707 |

FIG.7B

| DEVICE ID | LOCAL METADATA VERSION (UPDATE COUNTER) | CREATION DATA/TIME | GARBAGE COLLECTION DATE/TIME | SYNCHRONIZATION TIME |
|---|---|---|---|---|
| 711 | 713 | 715 | 717 | 719 |

· · ·

| DEVICE ID | LOCAL METADATA VERSION (UPDATE COUNTER) | CREATION DATA/TIME | GARBAGE COLLECTION DATE/TIME | SYNCHRONIZATION TIME |
|---|---|---|---|---|

APPARATUS AND METHOD FOR SYNCHRONIZING DATA IN CONNECTED DEVICES

CROSS-REFERENCE TO RELATED APPLICATION(S) AND CLAIM OF PRIORITY

The present application is related to and claims priority under 35 U.S.C. §119 to an application filed in the Korean Intellectual Property Office on Nov. 23, 2010 and assigned Serial No. 10-2010-0116722, the contents of which are incorporated herein by reference.

TECHNICAL FIELD OF THE INVENTION

The present invention relates generally to an apparatus and method for synchronizing data in network-connectable devices (or connected devices), and in particular, to an apparatus and method for detecting, by a connected device, data and a terminal requiring a synchronization process and performing a synchronization process with the terminal without using a synchronization server.

BACKGROUND OF THE INVENTION

The use of portable terminals is rapidly increasing due to their portability, and service providers (terminal manufacturers) are competitively developing portable terminals with convenient functions in order to attract more users.

For example, the portable terminals provide various functions such as a phone book, a game, a scheduler, a Short Message Service (SMS), a Multimedia Message Service (MMS), a Broadcast Message Service (BMS), an Internet service, an Electronic (E)-mail, a morning call, a MP3 (MPEG Audio Layer-3), and a digital camera.

In general, a user of a portable terminal stores personal data, such as directory and schedule data, in the portable terminal. Also, the user stores the personal data in a separate data storage server, in order to be able to store the personal data, stored in the previous portable terminal, intactly in a new portable terminal to be used due to the replacement or loss of the previous portable terminal. If the data stored in the portable terminal or the data storage server are changed, data synchronization should be performed between the portable terminal and the data storage server in order to equalize the data stored in the portable terminal and the data stored in the data storage server.

Herein, the portable terminal and the data storage server detect a change history of stored data to determine data requiring synchronization.

For example, the portable terminal and the data storage server compare specific codes of data to determine the need of synchronization between the data. However, the number of times of the comparison between specific codes increases with an increase in the number of data stored.

Also, if a data synchronization process is to be performed with respect to a plurality of devices, the connection of the devices should be maintained with respect to the data storage server. Thus, if a device requiring a data synchronization process cannot be connected to the data storage server, it is impossible to perform a data synchronization process with respect to the device.

Not only portable terminals but also more home appliances such as televisions (TVs), refrigerators, washing machines and electronic picture frames are connected to a network and evolve into information home appliances. That is, more and more devices can store data and provide a remote data access service. However, it becomes more difficult for users to locate their desired data among the overflowing information. Also, it will be more convenient for users if TVs can be used to search for and display pictures taken by cameras or portable terminals.

What is therefore required is an apparatus and method for synchronizing metadata of stored data (or information about stored data), thus making it easy to search for data in any device connected by a network.

SUMMARY OF THE INVENTION

An object of the present invention is to substantially solve at least the above problems and/or disadvantages and to provide at least the advantages below. Accordingly, an object of the present invention is to provide an apparatus and method for performing a synchronization process in connected devices without using a synchronization server.

Another aspect of the present invention is to provide an apparatus and method for detecting, by a connected device, a device requiring a synchronization process.

Another aspect of the present invention is to provide an apparatus and method for detecting, by a connected device, data requiring a synchronization process.

Another aspect of the present invention is to provide an apparatus and method for determining whether to perform a synchronization process, by a connected device on the basis of version information including updated data information.

In accordance with an aspect of the present invention, an apparatus that can synchronize data in connected devices includes: a memory unit that can store metadata updated according to update of data; and a synchronization unit that can update the metadata, create version information indicating whether the metadata are updated, and exchange version information with peripheral devices to determine a peripheral device and data requiring synchronization.

In accordance with another aspect of the present invention, a method for synchronizing data in connected devices includes: updating metadata according to update of data; creating version information indicating whether the metadata are updated; and exchanging version information with peripheral devices and determining a peripheral device and data requiring synchronization.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF THE INVENTION

FIGS. 1 through 9E, discussed below, and the various embodiments used to describe the principles of the present disclosure in this patent document are by way of illustration only and should not be construed in any way to limit the scope of the disclosure.

Exemplary embodiments of the present invention will be described herein below with reference to the accompanying drawings. In the following description, detailed descriptions of well-known functions or configurations will be omitted since they would unnecessarily obscure the subject matters of the present invention.

The present invention provides an apparatus and method for detecting, by a connected device, data and a device requiring a synchronization process and performing the synchronization process without using a synchronization server. The connected device means a network-connectable terminal, examples of which include televisions (TVs), refrigerators, washing machines, electronic picture frames, and portable terminals such as mobile terminals and portable multimedia players (PMPs), FIG. 1 illustrates a connected device for performing a synchronization process according to an exemplary embodiment of the present invention.

Figure 1:
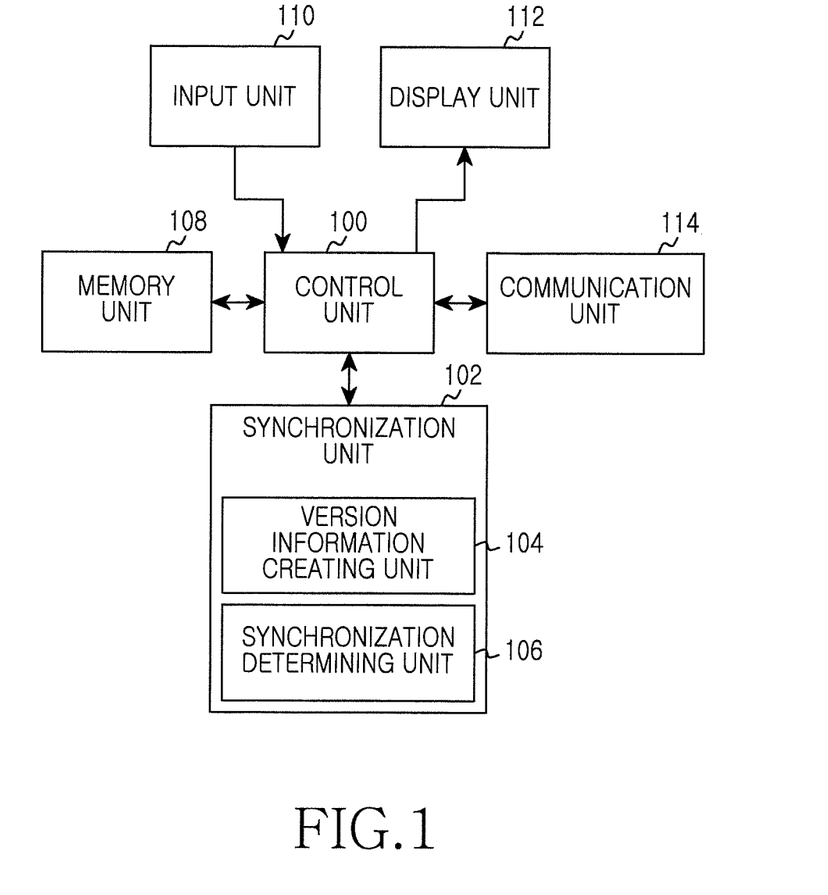
FIG. 1 illustrates a connected device for performing a synchronization process according to an exemplary embodiment of the present invention.

Referring to FIG. 1, the connected device includes a control unit 100, a synchronization unit 102, a memory unit 108, an input unit 110, a display unit 112, and a communication unit 114. The synchronization unit 102 can include a version information creating unit 104 and a synchronization determining unit 106.

The control unit 100 controls an overall operation of the connected device. For example, the control unit 100 processes and controls voice communication and data communication. In addition to the general functions, according to the present invention, when a prestored data update or a new data creation occurs, the control unit 100 manages metadata about the data. The metadata managed by the control unit 100 includes an update counter and data deletion information indicating whether data are deleted. The update counter is a counter accumulated according to a change in data, which means an update sequence of the data. The data deletion information is information about data deleted by a user. Even when the prestored data are deleted, the control unit 100 retains metadata about the deleted data. That is, the metadata with data deletion information indicates that actual data (or data corresponding to the metadata) are deleted and only the metadata are retained.

The control unit 100 controls the synchronization unit 102 to create version information for determining the data synchronization time point with respect to a peripheral device.

That is, the control unit 100 manages metadata about data requiring synchronization, and uses an update counter of the metadata to create version information. Also, when connected to an allowed device in a data synchronization process, the control unit 100 exchanges the created version information to perform the data synchronization process.

Under the control of the control unit 100, the synchronization unit 102 manages the metadata about the stored data and creates the version information about the metadata.

The synchronization unit 102 creates the version information by using the largest counter value among the update counters of the metadata, and compares the created version information with the version information of a peripheral device to determine the data synchronization time point.

For example, after setting an update counter '7' of the metadata as the version information, when detecting that the version information of a peripheral device is '10', the synchronization unit 102 synchronizes the metadata of a peripheral device corresponding to '8' to '10'.

That is, the synchronization unit 102 manages metadata about data requiring synchronization, uses an update counter of the metadata to create version information, and exchanges the created version information to perform a data synchronization process when connected to an allowed device in the data synchronization process, The version information creating unit 104 of the synchronization unit 102 creates version information for providing an update history of the stored data of the connected device to an allowed device in the data synchronization process. The version information includes local version information and global version information.

The local version information is version information created by the connected device (e.g., portable terminal), and the global version information is version information received from a peripheral device.

The local version information and the global version information include an identifier (ID) of a device storing the data, an update counter indicating an update count, metadata creation time information (Creation Date/Time), and data deletion time information (Garbage Collection Date/Time). Herein, the version information creating unit 104 sets the largest counter among the update counters of the metadata as the update counter of the version information, and the data deletion time information is information about the time when all the metadata including data deletion information are deleted.

In addition, the global version information further includes information about the data synchronization time.

The synchronization determining unit 106 of the synchronization unit 102 compares the local version information (i.e., its own version information prestored) with the global version information (i.e., the version information received from peripheral devices allowed in a data synchronization process), detects a peripheral device requiring a data synchronization process, and detects data to be synchronized with respect to the detected peripheral device.

The memory unit 108 preferably includes, for example, a ROM, a RAM and a flash ROM. The ROM stores various reference data and microcodes of a program for the process and control of the control unit 100 and the synchronization unit 102.

The RAM is a working memory of the control unit 100, which stores temporary data that are generated during the execution of various programs. The flash ROM stores various updatable data such as phone book, incoming messages, outgoing messages, metadata, and database.

The input unit 110 includes numeric keys of digits 0-9 and a plurality of function keys, such as a Menu key, a Cancel (Delete) key, a Confirmation key, a Talk key, an End key, an Internet connection key, Navigation keys (or Direction keys), and character input keys. The input unit 110 provides the control unit 100 with key input data that corresponds to a key pressed by the user.

The display unit 112 displays characters, moving pictures, still pictures and status information generated during an operation of the connected device. The display unit 112 may be a color liquid crystal display (LCD), Active Mode Organic Light Emitting Diode (AMOLED), and the like. If the display unit 112 has a touch input device and is applied to a touch input type device, it can be used as an input device.

The communication unit 114 transmits/receives Radio Frequency (RF) signals inputted/outputted through an antenna (not illustrated). For example, in a transmitting (TX) mode, the communication unit 114 channel-encodes, spreads and RF-processes TX data prior to transmission. In a receiving (RX) mode, the communication unit 114 converts a received RF signal into a baseband signal and despreads and channel-decodes the baseband signal to restore the original data. The communication unit 114 may be implemented using wired communication such as Ethernet and optical communication.

The control unit 100 can be configured to also perform the functions of the synchronization unit 102. Although separate units are provided for respective functions of the control unit 100, the control unit 100 can be configured to also perform all or some of the functions on behalf of such separate units.

Figure 2:
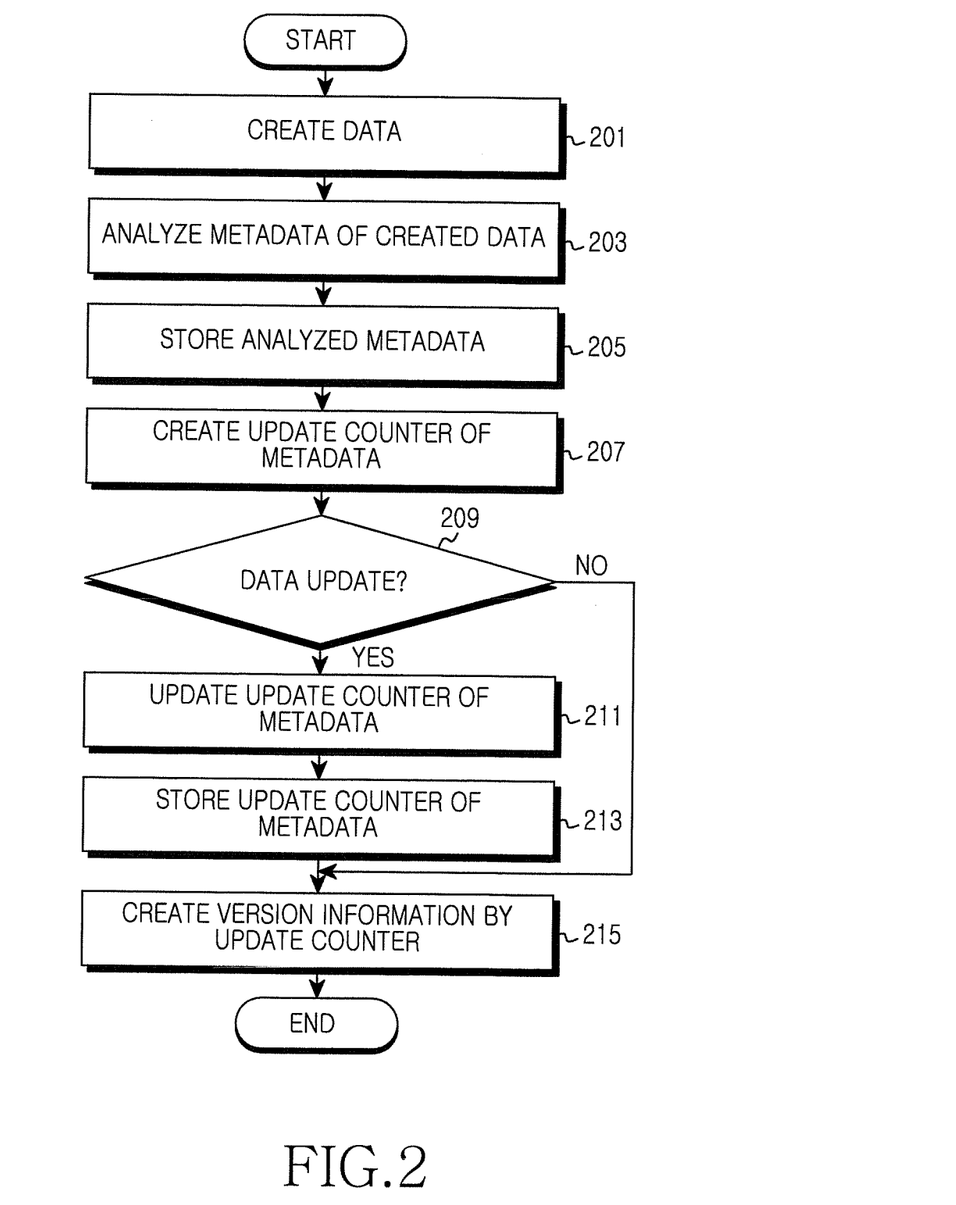
FIG. 2 illustrates a process of creating version information used to determine a data synchronization time point in a connected device according to an exemplary embodiment of the present invention.

FIG. 2 is illustrates a process of creating version information used to determine the data synchronization time point in the connected device according to an exemplary embodiment of the present invention.

Referring to FIG. 2, the connected device creates data in block 201. In block 203, the connected device analyzes metadata about the created data. Examples of the metadata analyzed by the connected device include the file name, the file format, the creation date and the storage location of data created to manage newly-created data.

In block 205, the connected device stores the metadata analyzed in block 203. In block 207, the connected device creates an update counter of the stored metadata. Herein, the update counter is a counter accumulated according to a change in data, which means an update sequence of the data. According to the present invention, the update counter may be included the metadata and may be stored in block 205 together with the metadata.

In block 209, the connected device determines whether a data update occurs with respect to the stored data. Herein, the data update means an event of changing the attribute of the data or the metadata of the data, examples of which include a data name change and a data storage time change.

If a data update does not occur (in block 209), the connected device proceeds to block 215. In block 215, the connected device creates version information about the prestored metadata. Herein, the version information is information for providing an update history of the created metadata from the connected device to an allowed device in the synchronization process. Like the local version information illustrated in FIG. 7, the version information can include an identifier (ID) of a device storing metadata, its own metadata version (an update counter indicating an update count), and metadata deletion flag deletion time information.

Alternatively, if a data update occurs (in block 209), the connected device proceeds to block 211. In block 211, the connected device updates an update counter of the metadata of the data updated. In block 213, the connected device stores the update counter of the updated metadata.

In block 215, the connected device creates version information about the prestored metadata. Herein, the connected device uses the largest counter value among the update counters of the metadata to create the version information used to determine the data synchronization time point with respect to the peripheral device.

Thereafter, the connected device ends the algorithm according to the present invention.

Figure 3:
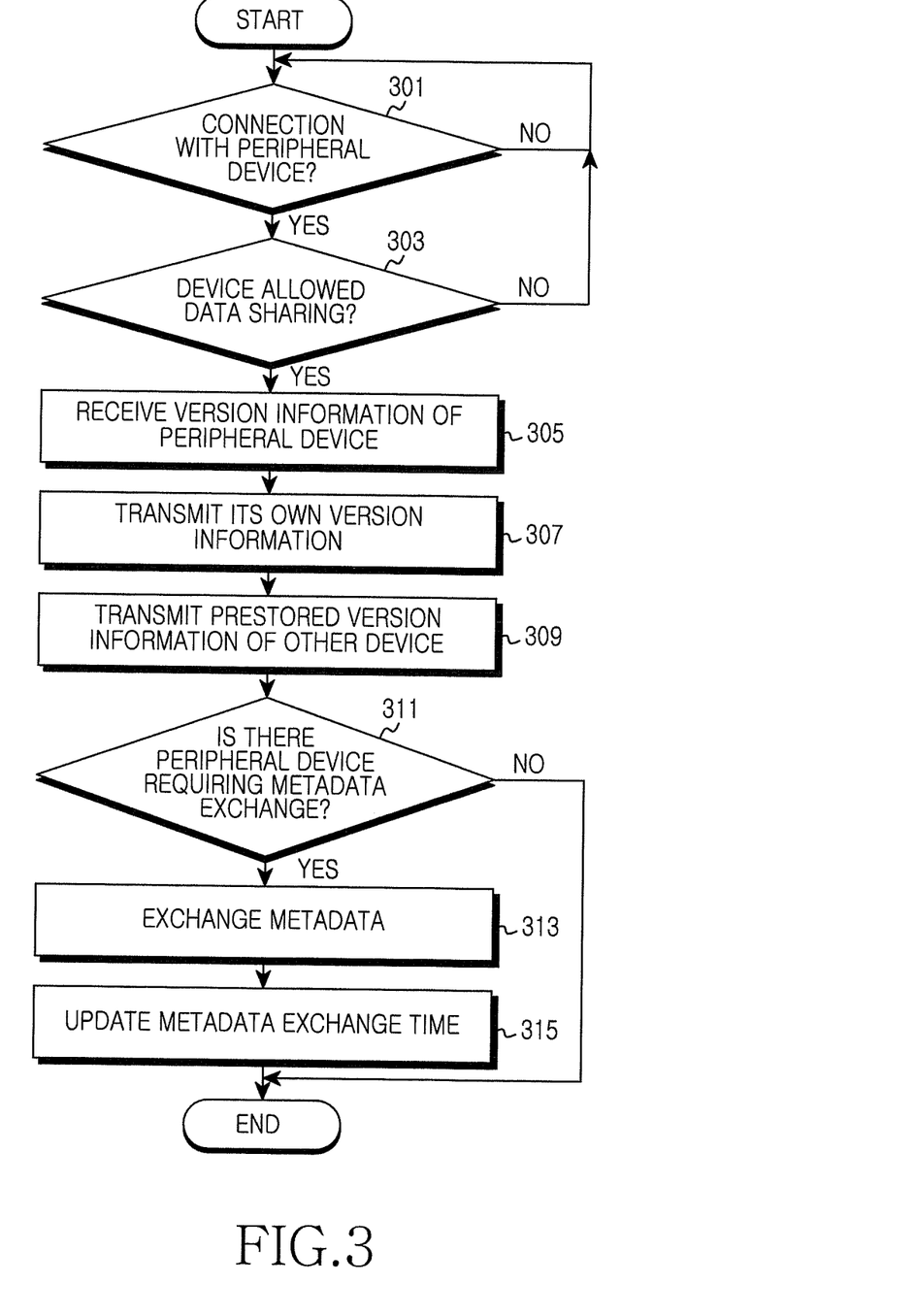
FIG. 3 illustrates a synchronization process of a connected device according to an exemplary embodiment of the present invention.

FIG. 3 illustrates a synchronization process of the connected device according to an exemplary embodiment of the present invention.

Referring to FIG. 3, in block 301, the connected device determines whether a connection with a peripheral device is performed for a synchronization process.

If a connection with a peripheral device is not performed (in block 301), the connected device returns to block 301.

Alternatively, if a connection with a peripheral device is performed (in block 301), the connected device proceeds to block 303. In block 303, the connected device determines whether the target peripheral device is allowed data sharing or data synchronization.

If the target peripheral device is not allowed (in block 303), the connected device returns to block 301.

Alternatively, if the target peripheral device is allowed (in block 303), the connected device connects with the allowed device and proceeds to block 305. In block 305, the connected device receives version information from the connected peripheral device. Like the global version information illustrated in FIG. 7, the version information received from the peripheral device can include an identifier (ID) of a device storing metadata, its own metadata version (an update counter indicating an update count), metadata deletion flag deletion time information, and synchronization time point (exchange time) information about the version information. The connected device can detect the metadata stored in the peripheral devices, by receiving the version information about the metadata stored in the connected peripheral devices as illustrated in block 305.

In block 307, the connected device transmits version information about the metadata stored therein (the local version information) to the connected peripheral device to enable the peripheral devices to know information about the metadata stored therein.

In block 309, the connected device transmits the global version information, received from peripheral devices other than the connected peripheral device, to the connected peripheral device. For example, if the connected device connects with a peripheral device A and connects with peripheral devices B and C to receive version information, the connected device transmits its own version information and the version information of the peripheral devices B and C to the peripheral device A. Accordingly, the peripheral device A can detect the version information of the peripheral devices B and C even without connecting with the peripheral devices B and C.

In block 311, the connected device determines whether there is a peripheral device requiring metadata exchange. Herein, the connected device can determine whether to perform metadata exchange, by comparing an update counter of the global version information received from a specific device with an update counter of the local version information created by the connected device. For example, it is assumed that the connected device retains the version information, created by the connected device, and has received the version information from the peripheral devices A and B in block 305.

However, if the version information received from the peripheral device A is not identical to the version information created by the connected device, the connected device attempts to exchange the metadata of the peripheral device A, by determining that the metadata of the peripheral device A have been updated. The determining of the peripheral device requiring metadata exchange will be described below in detail with reference to FIG. 4.

If there is no peripheral device requiring metadata exchange (in block 311), the connected device ends the algorithm or returns to block 301 to search for a peripheral device requiring the metadata exchange.

Alternatively, if there is a peripheral device requiring metadata exchange (in block 311), the connected device proceeds to block 313. In block 313, the connected device exchanges the metadata with the detected peripheral device. Herein, the connected device exchanges the changed metadata with the detected peripheral device.

In block 315, the connected device updates the data synchronization time for metadata exchange in the version information, to set the time when data synchronization is performed with respect to the peripheral devices.

Thereafter, the connected device ends the algorithm according to the present invention.

Figure 4:
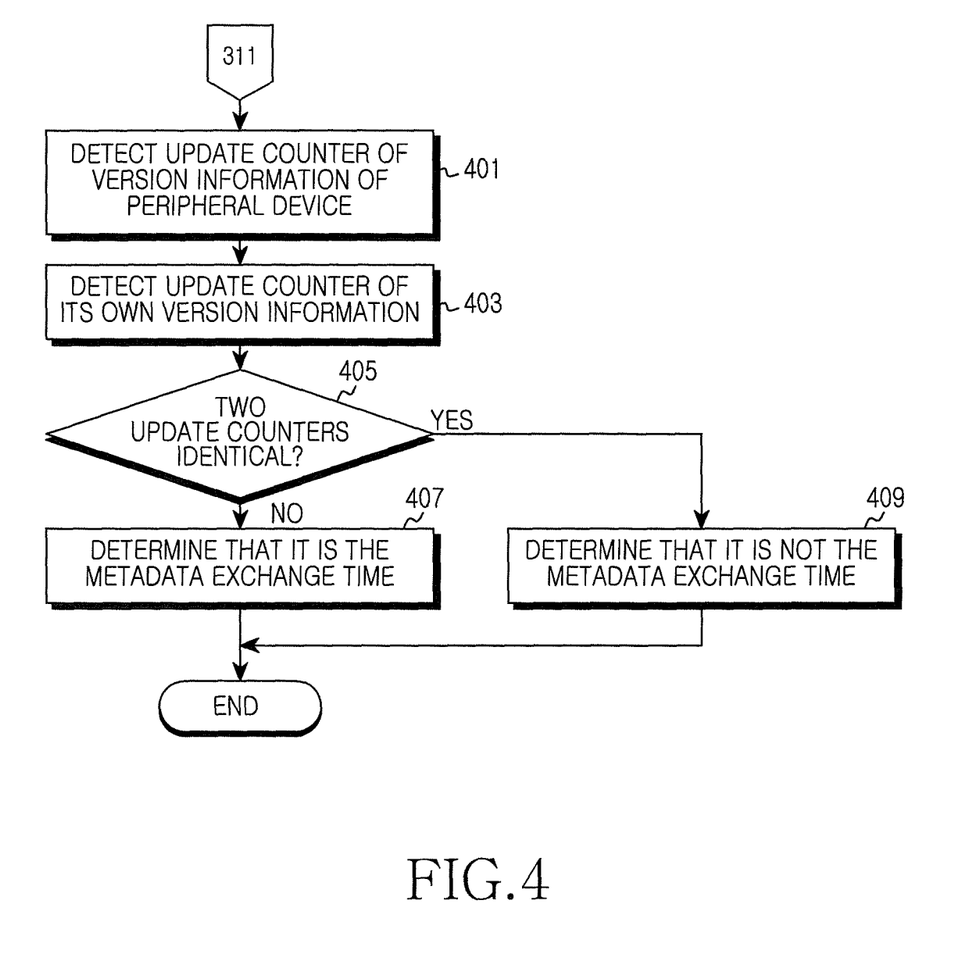
FIG. 4 illustrates a process of determining the metadata exchange time in a connected device according to an exemplary embodiment of the present invention.

FIG. 4 illustrates a process of determining the metadata exchange time in the connected device according to an exemplary embodiment of the present invention.

Referring to FIG. 4, in block 401, the connected device detects the update counter of the version information received from the peripheral device (i.e., the global version information). In block 403, the connected device detects the update counter of the version information created by the connected device (i.e., the local version information).

In block 405, the connected device determines whether the update counter of the version information received from the peripheral device is identical to the update counter of the version information created by the connected device.

If the update counter of the version information received from the peripheral device is identical to the update counter of the version information created by the connected device (in block 405), the connected device proceeds to block 409. In block 409, the connected device determines that it is not the metadata exchange time because there is no metadata requiring synchronization (that is, the same metadata are stored as in the peripheral device).

Alternatively, if the update counter of the version information received from the peripheral device is not identical to the update counter of the version information created by the connected device (in block 405), the connected device proceeds to block 407. In block 407, the connected device determines that it is the metadata exchange time because there is metadata requiring synchronization (that is, the different metadata are stored in comparison with the peripheral device).

Herein, the connected device performs data synchronization by using the version information received from the peripheral device, and updates the created version information on the basis of the received version information. That is, if the connected device updates data by comparing the version information created by the connected device A with the version information received from the peripheral device, the connected device updates the version information created by the connected device. In this case, if the updated information is A', the A' means the version information created by the connected device. This means that the version information created by the connected device is not fixed at the initially-created version information but is the version information that is updated through the synchronization process and is relevant to the connected device.

Thereafter, the connected device ends the algorithm according to the present invention.

Figure 5:
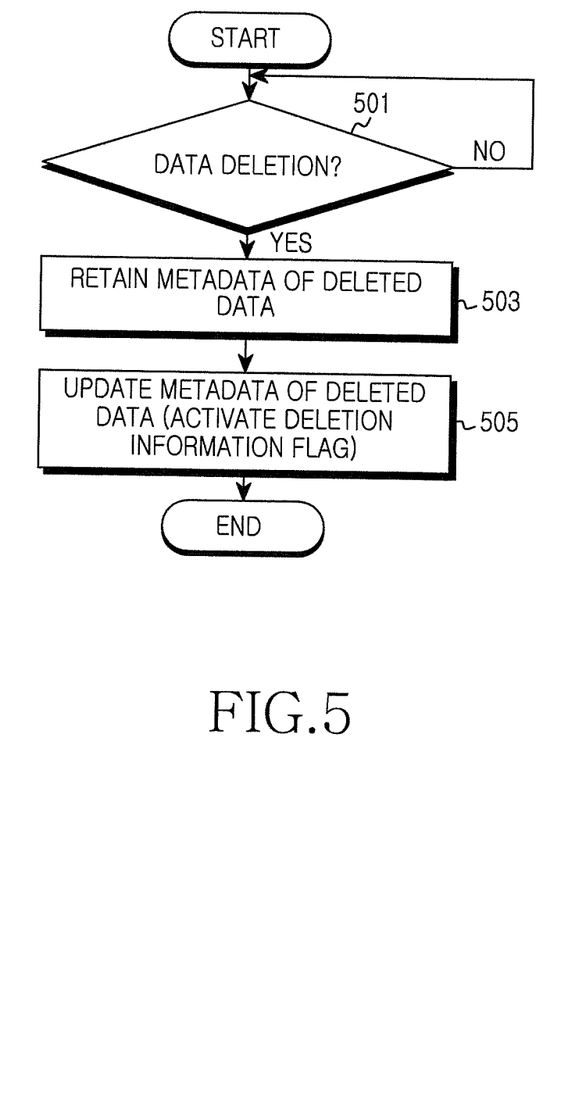
FIG. 5 illustrates a process of deleting metadata in a connected device according to an exemplary embodiment of the present invention.

FIG. 5 illustrates a process of deleting metadata in the connected device according to an exemplary embodiment of the present invention.

Referring to FIG. 5, in block 501, the connected device determines whether a data deletion user input is sensed.

If a data deletion user input is not sensed (in block 501), the connected device returns to block 501.

Alternatively, if a data deletion user input is sensed (in block 501), the connected device proceeds to block 503. In block 503, the connected device deletes only the data and retains the metadata corresponding to the deleted data. This is to provide information about the deleted data from the connected device to the peripheral device. However, in order not to continuously store metadata about the deleted data, the connected device can store metadata about the deleted data by a predetermined number of times or may delete the metadata about the deleted data from a memory unit if an information request for the deleted data does not occur for a predetermined time period.

In block 505, the connected device updates the metadata about the deleted data. That is, the connected device activates metadata deletion information about the deleted data (i.e., a deletion information flag) to indicate that the actual data are deleted and only the metadata are retained.

Thereafter, the connected device ends the algorithm according to the present invention.

Figure 6:
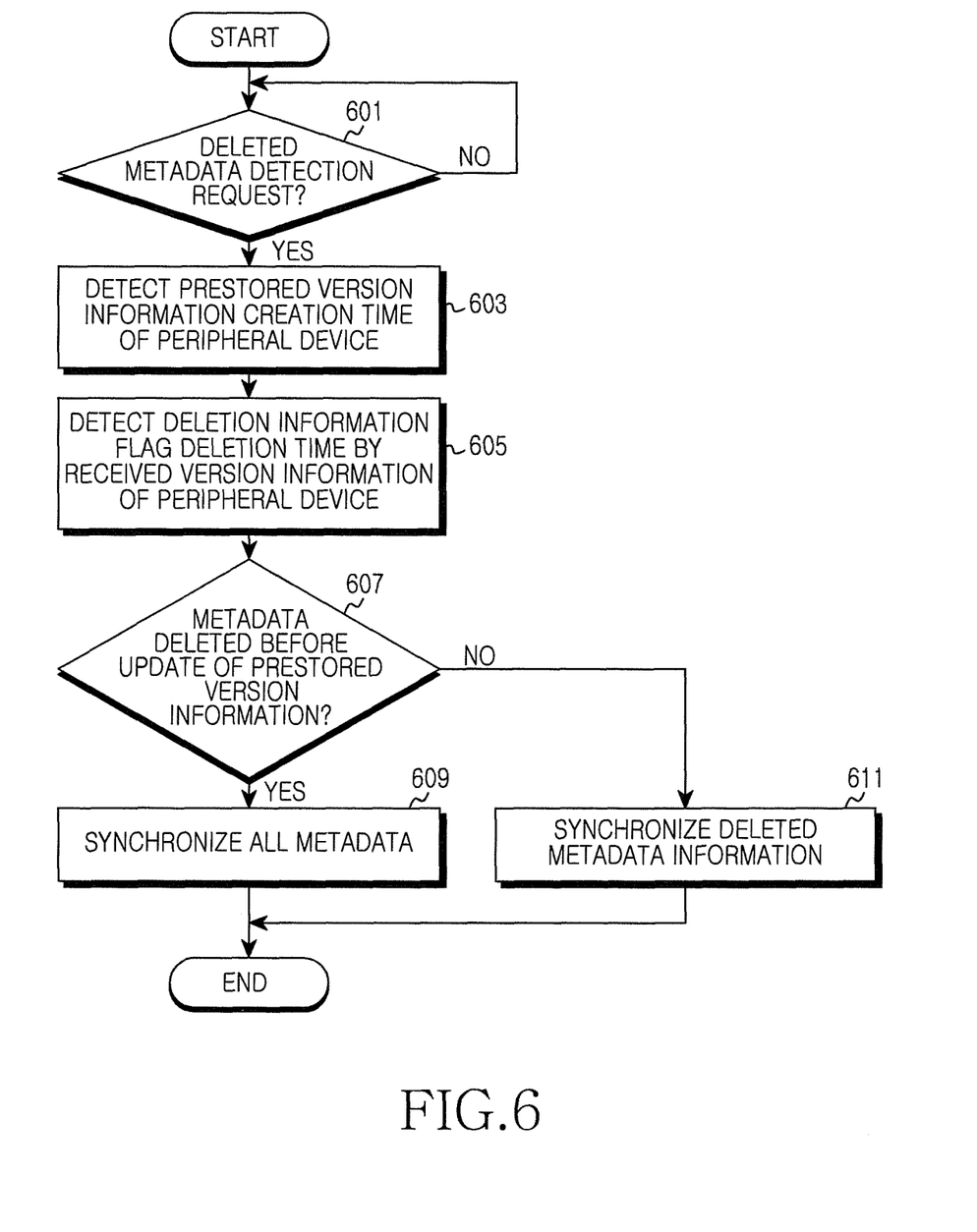
FIG. 6 is illustrates a synchronization process using metadata deletion information in a connected device according to another exemplary embodiment of the present invention.

FIG. 6 illustrates a synchronization process using metadata deletion information in the connected device according to another exemplary embodiment of the present invention.

Referring to FIG. 6, in block 601, the connected device determines whether a user request for detection of information about the deleted data is sensed.

If a user request for detection of information about the deleted data is not sensed (in block 601), the connected device returns to block 601.

Alternatively, if a user request for detection of information about the deleted data is sensed (in block 601), the connected device proceeds to block 603. In block 603, the connected device detects the creation time of the prestored version information of the peripheral device. In block 605, the connected device detects the version information of the metadata received from the connected peripheral device, and determines the deletion time (Garbage Collection Time) of the deletion information flag of the metadata.

Herein, the connected device detects the deletion time information indicating information about the deletion time of all the deletion information of the metadata among the version information to determine the deletion time of the deletion information flag of the metadata.

In block 607, the connected device compares the creation time of the version information and the deletion time of the deletion information flag.

If the creation time of the prestored version information of the peripheral device precedes the deletion time of the deletion information flag (Garbage Collection Time of Received Version Information>Creation Time of Prestored Version information), the connected device synchronizes all the metadata of the peripheral device because it cannot detect information about the data deleted in the synchronization process.

Alternatively, if the creation time of the prestored version information of the peripheral device follows the deletion time of the deletion information flag (Garbage Collection Time of Received Version Information<Creation Time of Prestored Version information), the connected device synchronizes the changed metadata of the peripheral device.

Thereafter, the connected device ends the algorithm according to the present invention.

Figure 7A:
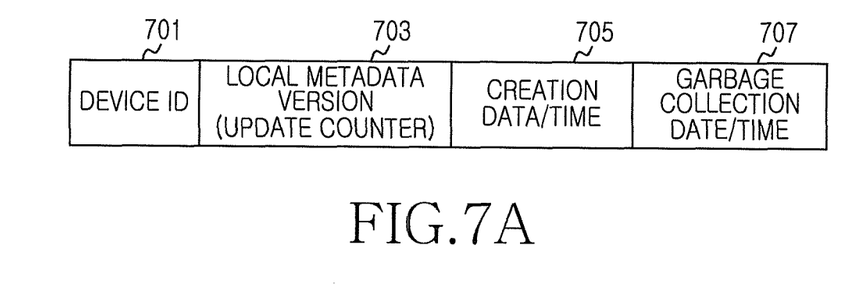
FIGS. 7A and 7B illustrate a format of version information used in a connected device according to an exemplary embodiment of the present invention.
Figure 7B:
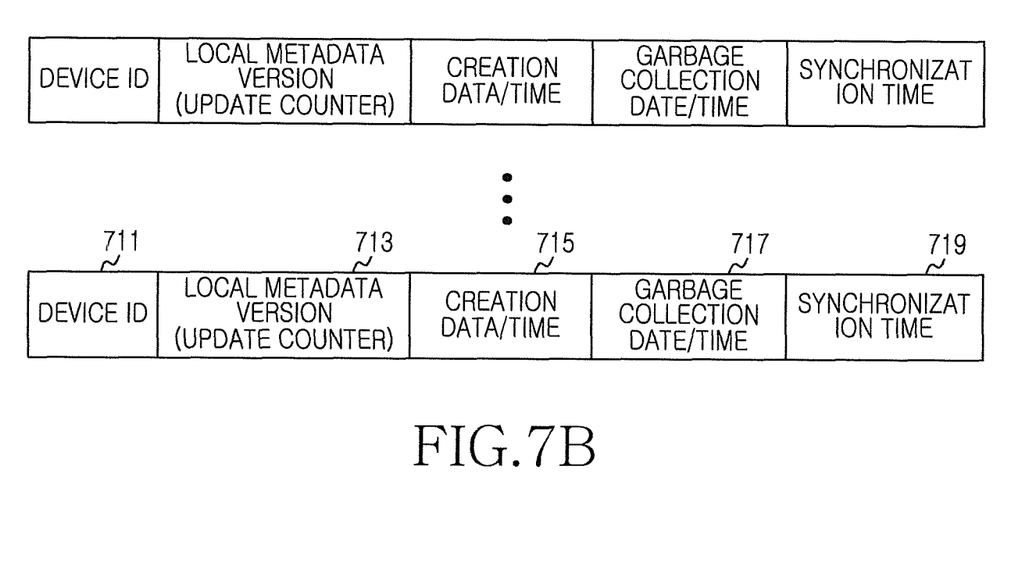

FIGS. 7A and 7B illustrate a format of version information used in the connected device according to an exemplary embodiment of the present invention.

Referring to FIG. 7, the version information may be divided into local version information (a) and global version information (b). The local version information is version information created by the portable terminal, and the global version information is version information received from the peripheral devices.

The local version information (a) includes a device ID 701 of a device storing data, an update counter 703 indicating an update count, metadata creation time information (Creation Date/Time) 705, and data deletion time information (Garbage Collection Date/Time) 707.

The update counter 703 means the version information of the largest counter among the update counters of the metadata, and the date deletion time information 707 represents information about the deletion time of all the metadata deletion information.

Like the local version information, the global version information (b) includes a device ID 711 of a device storing data, an update counter 713 indicating an update count, metadata creation time information (Creation Date/Time) 715, and data deletion time information (Garbage Collection Date/Time) 717. The global version information further includes synchronization time information 719 representing information about the time when the connected device exchanges data with the peripheral device.

The version information is transmitted to allowed peripheral devices. The peripheral devices having received the version information can determine whether a data update has occurred in the peripheral devices, by comparing the update counter of the prestored local version information created by the peripheral devices with the update counter of the newly-received global version information of the peripheral devices. For example, if the connected device detects the local version information having an update counter 103 and the global version information having update counters 100 and 90 received from the peripheral devices A and B, the connected device synchronizes metadata corresponding to the update counters 101 to 103 with respect to the peripheral device A corresponding to the update counter 100 and synchronizes metadata corresponding to the update counters 91 to 103 with respect to the peripheral device B corresponding to the update counter 90.

Also, the connected device simultaneously transmits its own version information and the prestored version information of other peripheral devices to the connected peripheral device, so that the allowed peripheral devices can share the version information of all the allowed devices through a small number of devices without communicating with each other.

Figure 8A:
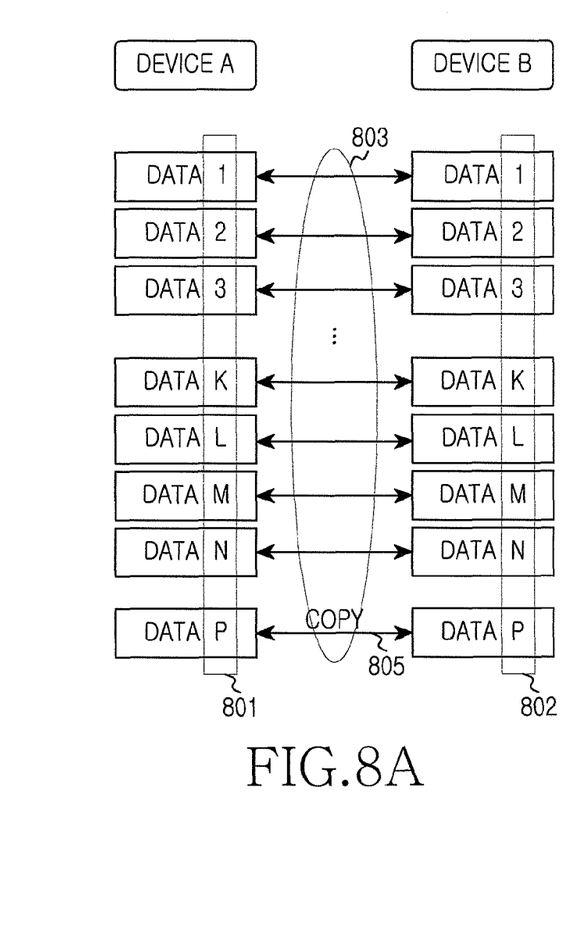
FIG. 8A illustrates a data synchronization process of a general connected device.
Figure 8B:
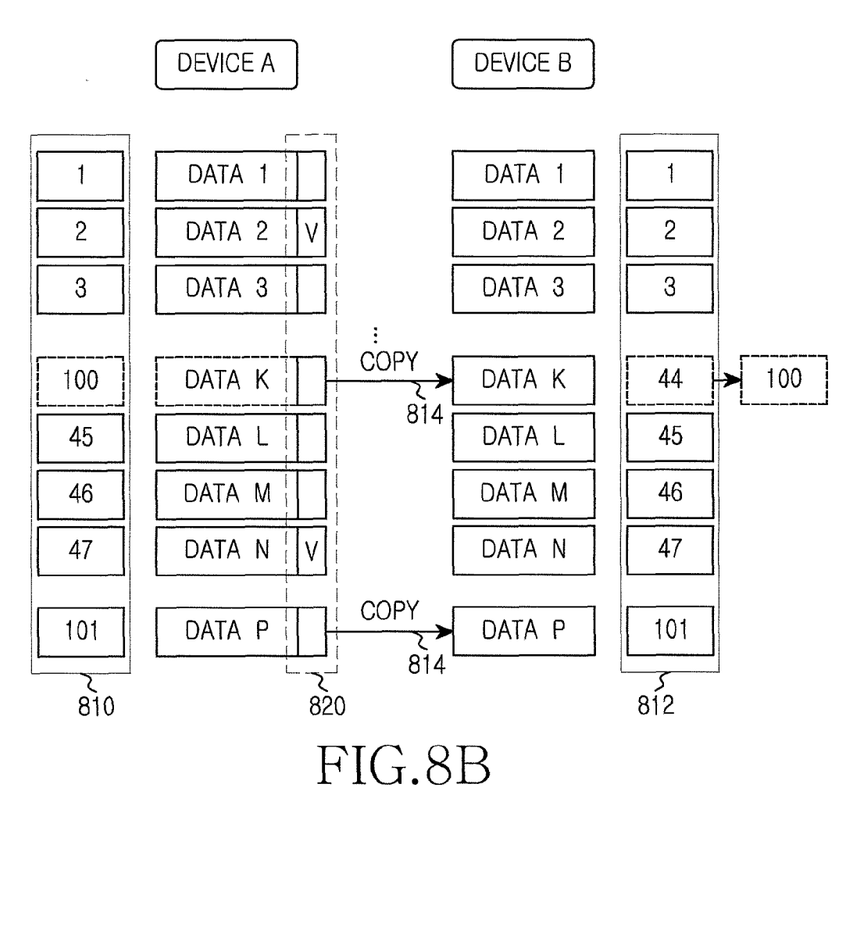
FIG. 8B illustrates a data synchronization process of a connected device according to an exemplary embodiment of the present invention.

FIGS. 8A and 8B illustrate the comparison of a data synchronization process of a general connected device and a data synchronization process of a connected device according to an exemplary embodiment of the present invention.

FIG. 8A illustrates a data synchronization process of a general connected device.

Referring to FIG. 8A, general devices determine whether to perform a data synchronization process, by detecting a specific code of data requiring synchronization.

In other words, as illustrated in FIG. 8A, a device A and a device B are set to synchronize a plurality of data.

Whether to perform synchronization is determined by comparing specific codes 801 and 802 (codes representing 1~P) of data stored in the devices. That is, the device A determines whether data 1 are present in the device B, and then determines whether data 2 are present. The above process is repeated to determine whether there is data having a code corresponding to P. Thereafter, in order to store the same data between two devices, data that are included only in the device are copied into the opponent device, and data that are not included in the device are copied from the opponent device.

In the above process, if data corresponding to the code K are not present in the device, the data corresponding to K are received from the device B. Also, if data corresponding to the code P are present only in the device A, the data corresponding to P are copied into the device B.

Accordingly, a synchronization process can be performed to equalize the data stored in the two devices.

However, the above case requires a long synchronization time because specific codes of synchronizable data are compared one by one.

FIG. 8B illustrates a data synchronization process of a connected device according to an exemplary embodiment of the present invention.

Referring to FIG. 8B, unlike the general device, the connected device of the present invention can detect data requiring synchronization, by detecting only the changed version information without comparing the specific codes one by one.

In other words, as illustrated in FIG. 8B, a device A and a device B are set to synchronize a plurality of data. In order to determine whether to perform synchronization, the devices include information about an update counter indicating an update count of metadata. The devices use the largest counter among the update counters to create version information, and share the created version information with a peripheral device to perform a data sharing process with respect to the peripheral device.

For example, the device A has exchanged version information about metadata with the device B.

That is, the update counter of the metadata K of the device A was 44, and the update counter 44 is updated into 100 when the metadata K are updated.

After the update counter is updated, if a data update or a data creation occurs with respect to the data P, the device A updates the update counter of the data P into 101.

The device A has up to 99 update counters of metadata until the occurrence of an update with respect to the data K and P, so that it creates local version information including the update counter 99 to perform a version information exchange process with respect to the peripheral device.

However, when an update occurs with respect to the data K and P, the device A creates local version information including an update counter 101 (810), but it may be assumed that device A has not exchanged the newly-created version information with the device B.

On the above assumption, the device A stores version information including the update counter 101, and the device B stores version information about the device A including the update counter 99 (global version information about the device A). A synchronization process is not performed with respect to the data K and P updated in the device A.

If the device B receives the version information including the update counter 101 from the device A, the update counter 101 included in the version information is not identical to the update counter 99 of the prestored version information. Thus, the device B can determine that an update of metadata corresponding to the update counters 100 to 101 has occurred in the device A after the synchronization process.

Accordingly, through the synchronization process, the device A copies the data K and the data P corresponding to 101 into the device B (814) to perform data synchronization. Upon receiving the data P corresponding to "101", the device B sets the update counter of the version information about the data P to "101" and sets the update counter about the data K to "44" to "100" to equalize it with the update counter of the device A (812).

Also, the metadata stored in the device can include a deletion information flag 820 indicating the deletion of data corresponding to metadata. As illustrated in FIG. 8, a mark "√" indicates that the actual data are deleted and only the metadata are retained. As illustrated in FIG. 8, the data 2 and n marked with "√" indicate that the actual data are deleted and the metadata are retained.

FIGS. 9A to 9E illustrate a process of sharing version information in the connected device according to an exemplary embodiment of the present invention.

Figure 9A:
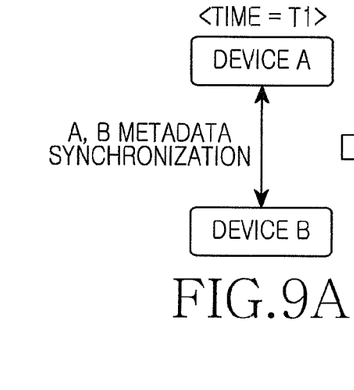
FIGS. 9A to 9E illustrate a process of sharing version information in a connected device according to an exemplary embodiment of the present invention.

Referring to FIG. 9A, a device A and a device B connect with each other to perform a metadata synchronization process. The devices exchange version information about metadata with each other, such that the device A has its own version information and version information of the device B and the device B has its own version information and version information of the device A.

Figure 9B:
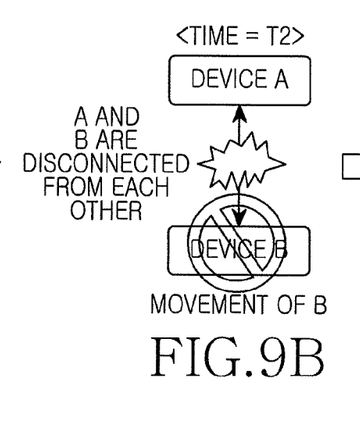

Referring to FIG. 9B, when the device B moves, the connection between the devices is released.

Figure 9C:
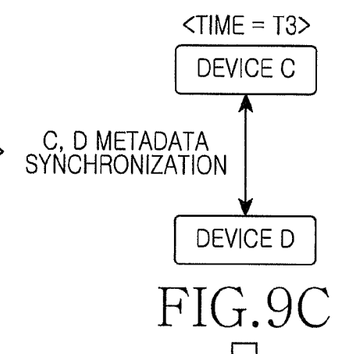

Referring to FIG. 9C, a device C and a device D connect with each other to perform a metadata synchronization process. The devices exchange version information about metadata with each other, such that the device C has its own version information and version information of the device D and the device D has its own version information and version information of the device C.

Figure 9D:
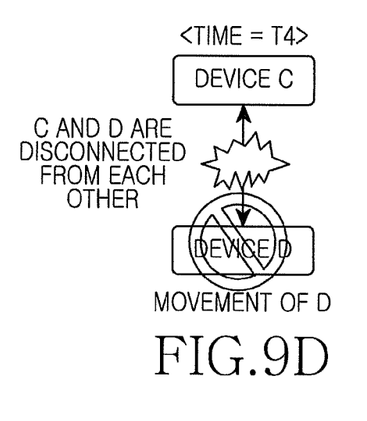

Referring to FIG. 9D, when the device D moves, the connection between the devices is released.

Figure 9E:
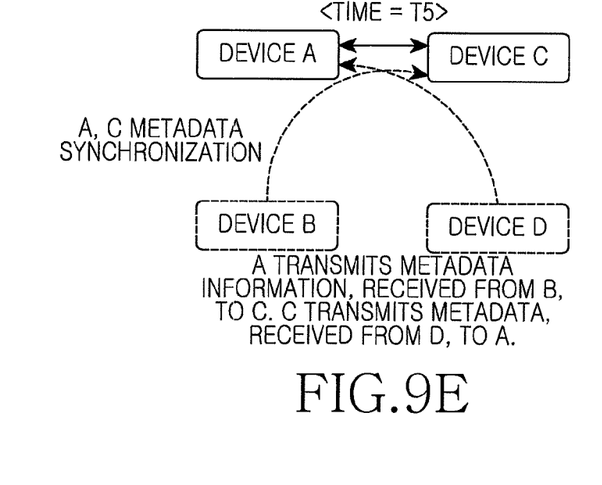

Referring to FIG. 9E, when the device A and the device C connect with each other to perform a metadata synchronization process, the devices exchange version information about their metadata. At this point, the device A also transmits the version information of the device B, received in FIG. 8A, to the device C, and the device C also transmits the version information of the device D, received in FIG. 8C, to the device A.

Accordingly, the device A shares the version information of the device D even without connecting with the device D. Thus, the device A has the version information of the devices B, C and D. Likewise, the device C can share the version information of the device B even without connecting with the device B.

Portable terminals such as mobile terminals and MP3 players cannot continuously perform a synchronization process due to power consumption, and stationary terminals such as TVs and DVD/BD players can continuously receive power to provide a synchronization service. In this case, the portable terminal can initiate a synchronization service at a call end time point, a screen control start or end time point, or at predetermined periods.

The devices having shared the version information can easily detect the device and metadata requiring synchronization.

As described above, the present invention detects the version information including the updated data information, thus making it possible to easily detect the device and data requiring synchronization and to detect the version information of a third device without using a synchronization server.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus capable of synchronizing data in a connected device, the apparatus comprising:
   a memory unit configured to store metadata updated according to a data update;
   a communication unit configured to transmit and receive version information to and from peripheral devices, wherein the version information indicates whether the metadata are updated; and
   a synchronization unit configured to update the metadata, create the version information of the connected device, and receive the version information of the peripheral devices to determine data requiring synchronization,
   wherein the synchronization unit is further configured to:
      receive, from a first device among the peripheral devices, version information of the first device in response to a connection with the first device, and
      transmit the version information of the first device to a second device among the peripheral devices in response to a further connection with the second device,
   wherein the second device is configured to receive the version information of the first device without connecting with the first device.

2. The apparatus of claim 1, wherein the synchronization unit is configured to update an update counter of the metadata according to the data update and transmit the update counter to the peripheral devices.

3. The apparatus of claim 2, wherein the synchronization unit is configured to use the update counter of the metadata to create the version information,
   wherein the version information includes a device identifier (ID), a metadata update counter, a version information creation time point, and a metadata deletion flag deletion time point.

4. The apparatus of claim 1, wherein the version information includes local version information corresponding to version information of the connected device and global version information corresponding to version information of the peripheral devices,
   wherein the global version information includes information about a synchronization time point.

5. The apparatus of claim 1, wherein the metadata includes a deletion information flag indicating whether actual data corresponding to the metadata are deleted.

6. The apparatus of claim 1, wherein:
if an update counter of the version information created by the peripheral devices until data are updated is identical to an update counter of the version information created by the peripheral devices after data are updated, the synchronization unit is configured to determine that there is no peripheral device and data requiring synchronization; and
if the two update counters are not identical to each other, the synchronization unit is configured to determine that there are a peripheral device and data requiring synchronization.

7. The apparatus of claim 1, wherein the synchronization unit is configured to detect a deletion time point of the data to determine a peripheral device and data requiring synchronization.

8. The apparatus of claim 7, wherein:
if the metadata are determined to be deleted before the version information of the connected device is updated, the synchronization unit is configured to synchronize all the metadata stored in the peripheral device; and
if the metadata are determined to be deleted after the version information of the connected device is updated, the synchronization unit is configured to synchronize only the deleted metadata among the metadata stored in the peripheral device.

9. The apparatus of claim 5, wherein the synchronization unit is configured to set a deletion information flag of metadata when deleting data, and retain metadata about the deleted data.

10. A method for synchronizing data in a connected device, the method comprising:
storing metadata according to a data update;
creating version information of the connected device indicating whether the metadata are updated;
receiving, from a first peripheral device among peripheral devices, version information of the first device and determining data requiring synchronization; and
in response to a further connection with a second peripheral device among the peripheral devices, transmitting the received version information of the first peripheral device to the second peripheral device,
wherein the second peripheral device is configured to receive the version information of the first peripheral device without connecting with the first device.

11. The method of claim 10, wherein storing the metadata according to the data update comprises updating an update counter of the metadata when the data are updated and transmitting the update counter to the peripheral devices.

12. The method of claim 11, wherein creating the version information comprises using the update counter of the metadata to create the version information,
wherein the version information includes a device identifier (ID), a metadata update counter, a version information creation time point, and a metadata deletion flag deletion time point.

13. The method of claim 10, wherein the version information includes local version information corresponding to version information of the connected device and global version information corresponding to version information of the first peripheral device,
wherein the global version information includes information about a synchronization time point.

14. The method of claim 10, wherein the metadata include a deletion information flag indicating whether actual data corresponding to the metadata are deleted.

15. The method of claim 10, wherein determining the data requiring synchronization comprises:
if an update counter of the version information created by the peripheral devices until data are updated is identical to an update counter of the version information created by the peripheral devices after data are updated, determining that there is no peripheral device and data requiring synchronization; and
if the two update counters are not identical to each other, determining that there are a peripheral device and data requiring synchronization.

16. The method of claim 10, wherein determining the data requiring synchronization is performed by detecting a deletion time point of the data.

17. The method of claim 16, wherein determining the data requiring synchronization comprises:
if the metadata are determined to be deleted before the version information of the peripheral device is updated, synchronizing all the metadata stored in the second peripheral device; and
if the metadata are determined to be deleted after the version information of the peripheral device is updated, synchronizing only the deleted metadata among the metadata stored in the second peripheral device.

18. The method of claim 14, further comprising:
updating the data and updating the metadata according to an update history of the data; and
setting a deletion information flag of the metadata when deleting the data.

19. A wireless communication terminal configured to synchronize data with connected devices, the terminal comprising:
a memory unit configured to update the metadata, create version information indicating whether the metadata are updated, and transmit and receive version information to and from peripheral devices to determine data requiring synchronization, and
wherein the synchronization unit is further configured to:
receive, from a first device among the peripheral devices, version information of the first device in response to a connection with the first device, and
transmit the version information of the first device to a second device among the peripheral devices in response to a further connection with the second device,
wherein the second device is configured to receive the version information of the first device without connecting with the first device.

20. The terminal of claim 19, wherein the synchronization unit is configured to update an update counter of the metadata when the data are update.

21. The apparatus of claim 1, wherein the synchronization unit is further configured to:
receive first data from the first device during the connection with the first device, wherein the version information of the first device includes version information about the first data, and
transmit the version information about the first data received from the first device to the second device during the further connection.

* * * * *